July 23, 1929.  R. S. MOORE  1,721,667
STEERING MECHANISM FOR LOCOMOTIVE CRANES
Original Filed July 17, 1920  3 Sheets-Sheet 1

Inventor.
Roy S Moore,
By Sprinkle & Smith
Attys.

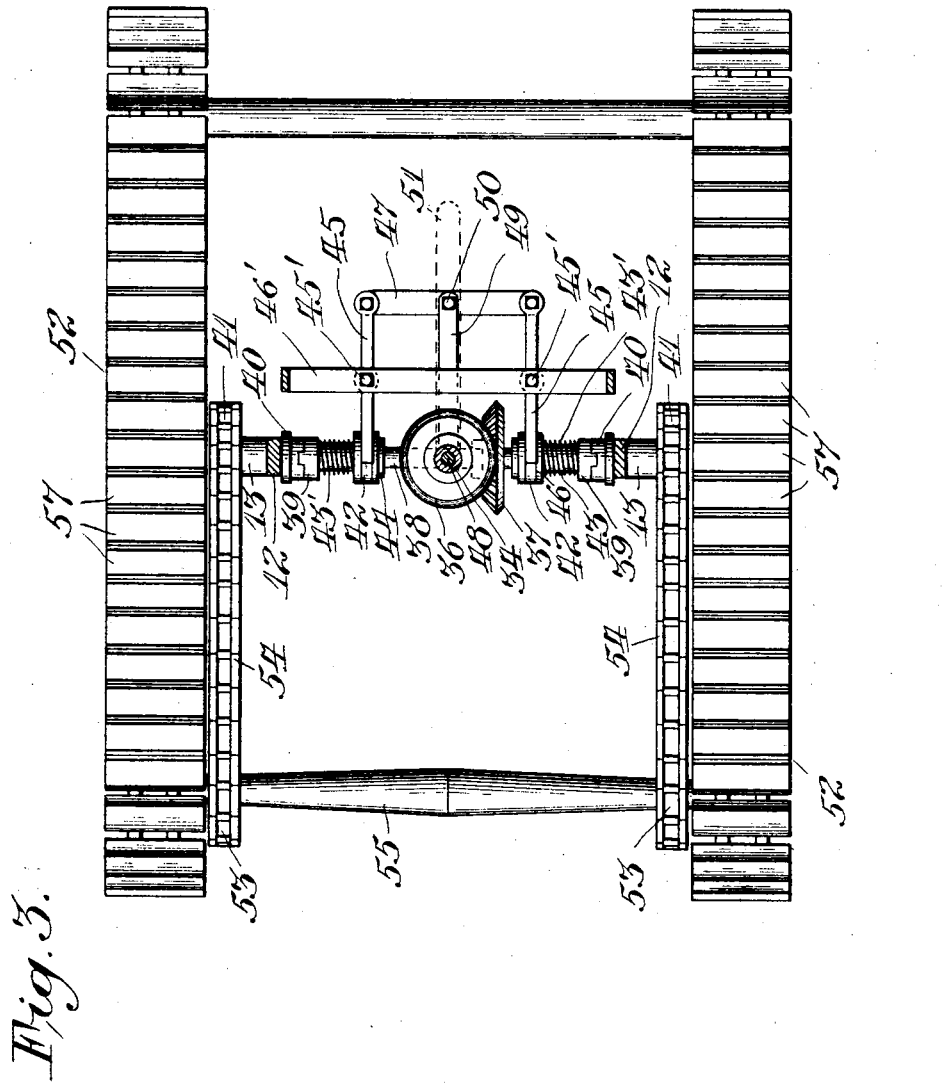

July 23, 1929. R. S. MOORE 1,721,667
STEERING MECHANISM FOR LOCOMOTIVE CRANES
Original Filed July 17, 1920 3 Sheets-Sheet 3
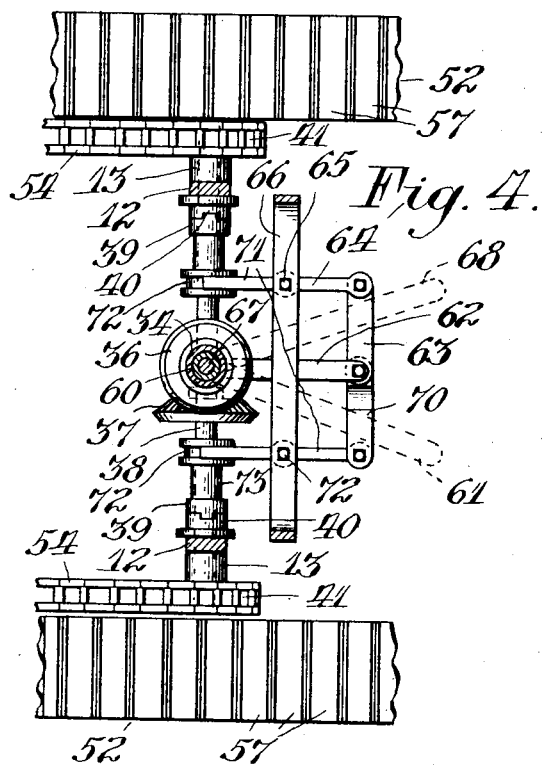
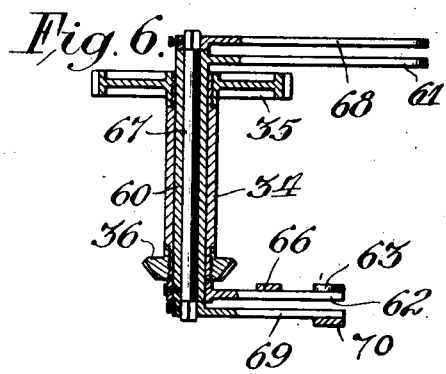
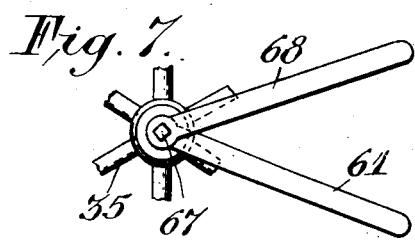
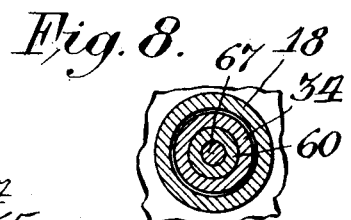
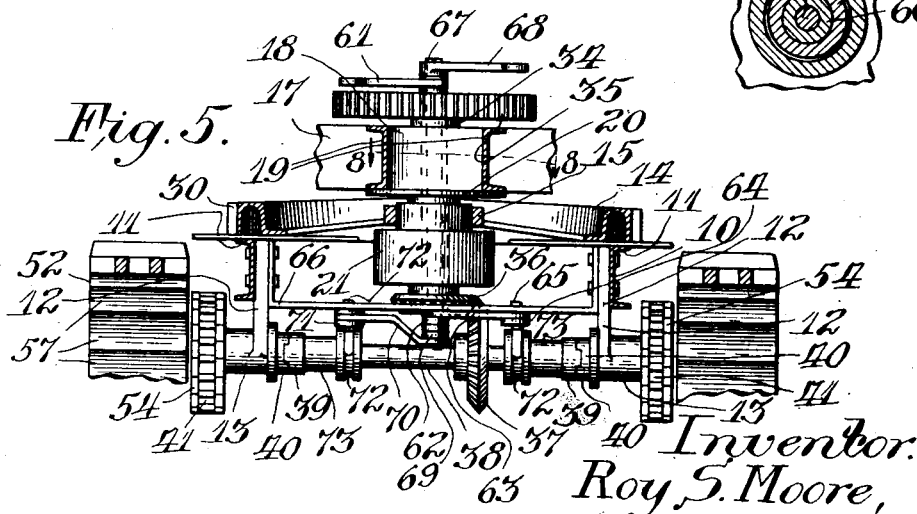
Inventor:
Roy S. Moore,
By Sprinkle & Smith
Attys.

Patented July 23, 1929.

1,721,667

UNITED STATES PATENT OFFICE.

ROY S. MOORE, OF CHICAGO, ILLINOIS, ASSIGNOR, BY MESNE ASSIGNMENTS, TO MANITOWOC SHIP BUILDING CORPORATION, OF MANITOWOC, WISCONSIN, A CORPORATION OF WISCONSIN.

STEERING MECHANISM FOR LOCOMOTIVE CRANES.

Original application filed July 17, 1920, Serial No. 397,077. Divided and this application filed May 16, 1924. Serial No. 713,666.

This invention relates to a steering mechanism and more particularly to a steering mechanism for locomotive cranes of the type provided with a swing body.

One of the objects of the present invention is to provide an improved and simplified form of a steering mechanism for locomotive cranes of the swing body type.

A further object of the invention is to provide a steering mechanism for a locomotive crane in which the power propelling shaft extends through the pivotal connection of the swing body and a manually actuated control shaft extends through the power propelling shaft for controlling the steering of the locomotive crane.

A still further object of the invention is to provide an improved form of steering mechanism for a locomotive crane of the self-laying track or endless belt traction type having a swing body mounted thereon.

These and other objects are accomplished by providing a construction and an arrangement of the various parts in the manner hereinafter described and particularly pointed out in the appended claims.

Referring to the drawings, Fig. 1 is a side elevational view of a self-laying track type of locomotive crane having my improved steering mechanism embodied therein.

Fig. 3 is a top plan view of the traction propelling or self-laying track mechanism with the swing body removed.

Fig. 4 is a fragmentary view showing a modification of the clutch controlling mechanism for operatively connecting the power transmitting shaft with the propelling mechanism.

Fig. 5 is a fragmentary transverse vertical sectional view taken through the axis of the swing body of the construction shown in Fig. 4.

Fig. 6 is a detailed vertical sectional view taken through the axis of the power transmission shaft and the manually actuated clutch controlling shafts.

Fig. 7 is a detailed top plan view of the levers for controlling the clutch mechanism, and Fig. 8 is a detailed cross sectional view taken on the lines 8—8 in Fig. 5.

Figure 1:
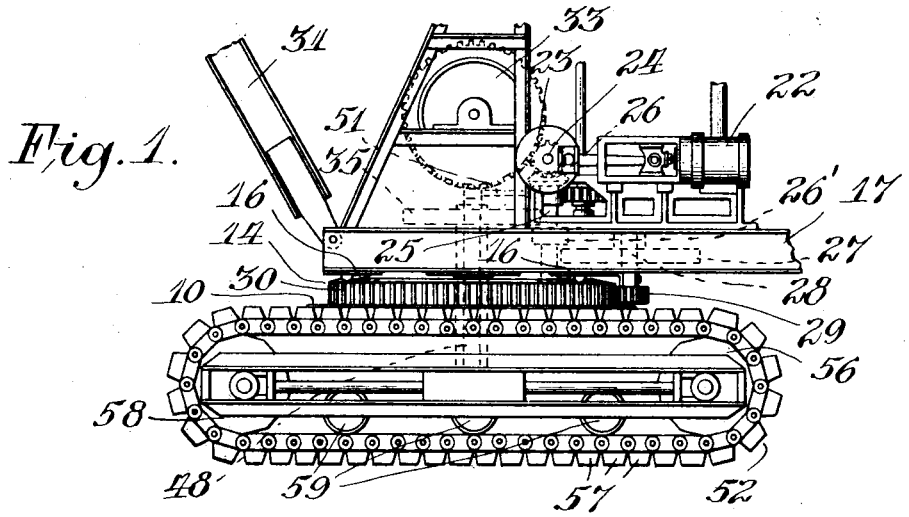
Figure 2:
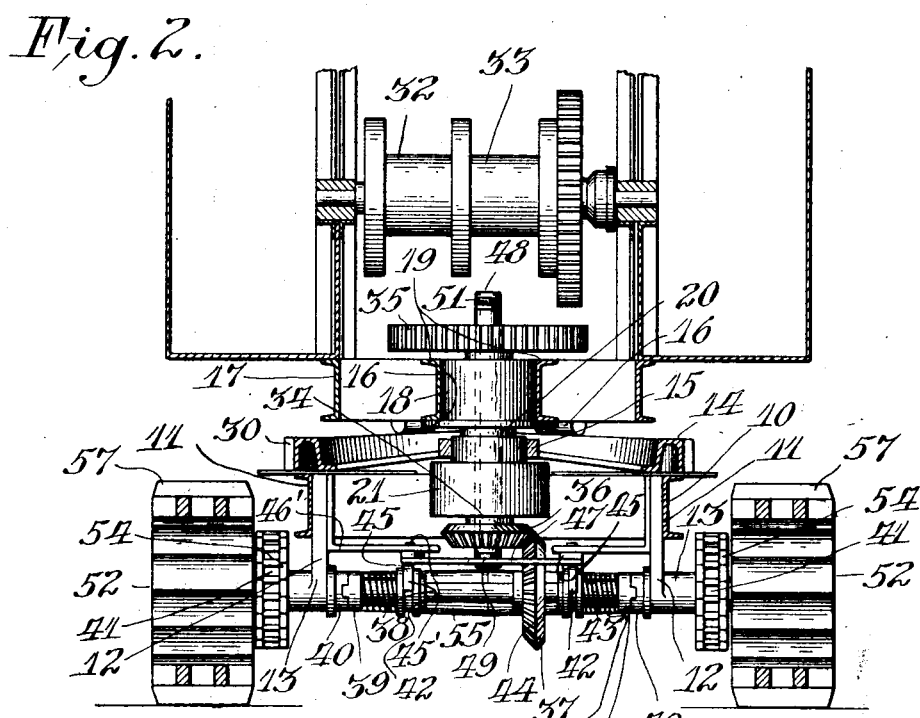
Fig. 2 is an enlarged cross sectional view taken on a vertical transverse plane passing through the axis of the swing body.

The present invention is a division of my co-pending application Serial No. 397,077, filed July 17, 1920, and is particularly directed to an improved construction of a steering mechanism for controlling the steering of a locomotive crane of the type provided with the self-laying track having a swing body mounted thereon.

In illustrating my invention I have shown the same in connection with a main frame truck 10 which comprises longitudinally extending main frame members 11 which have secured thereto, in any well known manner, depending brackets 12 which have formed integrally therewith, adjacent the lower ends thereof, bearing portions 13. Secured to the main frame or truck 10, in any well known manner, is a suitable supporting track 14. The track 14 is in the form of a wheel or spider and is provided with a central hub portion 15 which is perforated and adapted to receive a suitable pivotal means for swivelly mounting the swing body or rotating bed of the locomotive crane. Suitable anti-friction rollers 16 are carried by the swing body or rotating bed which engage the upper surface of the track in a manner to permit the swing body or bed to rotate about its axis on the truck with great facility and ease. The swing body which comprises a main frame 17 is pivotally mounted with respect to the truck 10 of the locomotive crane by means of a hollow king pin 18, which is secured in any well known manner to the supplemental frame members 19 of the swing body 17. The king pin 18 is provided with a relatively reduced portion 20 which extends downwardly and is journalled in a bearing bracket 21 secured in any well known manner to the truck 10. For a more detailed description of the above described mechanism see my co-pending application above referred to.

The swing body 17 is provided with a steam engine 22 which is operatively connected to a fly wheel 23, which, in turn operatively drives an engine shaft 24. A vertical shaft 25 suitably journaled in the swing body frame 17 carries a bevelled gear 26 at its upper extremity meshing with a bevelled gear on the engine shaft 24, not shown. By the aforesaid construction the bevelled gear carried by the shaft 24 engaging the bevel gear 26 is controlled by suitable friction clutches, not shown. By reason of this clutch mechanism, it will be understood that rotation to the shaft 25 may be imparted in either direction from the engine shaft 24 by the control of the operator.

The shaft 25 has splined thereto a spur gear 26' which is adapted to be adjusted longitudinally of the shaft in such a manner that it may be positioned to mesh with a spur gear 27 secured to a vertical shaft 28 mounted in the swing body 17. Secured to the lower end of the shaft 28 is a spur gear 29 which is adapted to mesh with teeth 30 formed on the periphery of the track 14. From the above description it will be noted that when the operator desires to rotate the swing body 17 with respect to the truck that the gear 26' is shifted into meshing relation with the gear 27 and through the mechanism above described the shaft 28 may be operatively driven in either direction to rotate the swing body in either direction about its axis on the truck. The swing body 17 is provided with the usual boom 31 and winding drums 32 and 33, which are operatively driven by the engine 22 in any well known manner. The mechanism for operatively connecting or transmitting the power from the engine to the propelling means of the truck comprises the tubular or hollow drive shaft 34 and has secured at its upper end, preferably by threaded engagement, a spur gear 35. Secured to the lower end of the power transmitting shaft 34 is a bevelled gear 36, which is adapted to mesh with a bevelled gear 37 secured to the drive shaft 38. The drive shaft 38 is journalled in the bearing portions 13 of the depending brackets 12. Splined to the drive shaft 38 and on opposite sides of the bevelled gear 37 are clutch members 39 which are adapted to engage corresponding clutch members 40 which are journalled on the shaft 38 and have sleeve portions (not shown) extending through the bearing portions 13 of the depending brackets 12 and have secured on their outer ends in any well known manner driving sprockets 41. The clutch members 39 are adapted to be moved into and out of engagement with the clutch members 40 by shifter rings 42, which are slidably mounted on the reduced portions 43 of the clutch members 39. The clutch members 39 are held outwardly with respect to the shifter rings 42 by compression springs 43', and the clutch members 39 are limited in their outward movement with respect to the shifter rings 42 by flanges 44 formed integrally with the clutch members 39. The shifter rings 42 are controlled or shifted by forks 45 which are seated in grooves 46 of the shifter rings 42. The shifter forks 45 are pivoted as shown at 45' to the frame members 46', which extends across and is secured to the main frame member 11 of the truck. The outer or free ends of the fork members 45 are secured together by a cross tie 47.

A novel feature of the present invention is the provision of an actuating means extending through the tubular transmission shaft for controlling this clutch mechanism. This controlling means comprises an oscillatable shaft 48 which extends through the power transmission shaft 34 and is provided with an arm 49 at its lower end, which has its free end pivotally connected to the cross tie 47, as shown at 50. The upper end of the control shaft has secured thereto an actuating lever 51 which is conveniently positioned within easy reach of the operator.

From the above description it will be seen that by swinging the hand operating lever 51 to the right or the left of the position shown in Fig. 3 of the drawing that one of the clutch members 39 is shifted longitudinally to disengage it from its corresponding clutch member 40, while the other shifter ring 42 is compressing the spring 43' and retaining the clutch in engagement. In other words, as the hand lever 51 is shifted to one side of its normal longitudinal center it oscillates the shaft 48, which, in turn, swings the arm 49 connected thereto and swings the link 47 and the shifter forks 45 about their pivots 45', disengaging one of the clutches and retaining the other clutch in engagement. By doing this, it will, of course, be understood that one of the endless belt or self-laying track propelling means 52 is operatively driven, while the other remains stationary, causing the locomotive crane to turn about a stationary endless traction propelling means as a center. It will, of course, be understood that the drive sprockets 41 are operatively geared to drive sprockets 53 by means of drive chains 54. The drive sprockets 53 are journaled on the shaft 55 and have secured thereto in any well known manner self-laying track wheels 56 which operatively drive the propelling means or endless tracks 57, it, of course, being understood that each of the endless self-laying tracks are provided with idler track wheels 58 and the usual rollers 59.

In Figs. 4 to 8 inclusive I have shown a modification of my invention in which I have provided separate controlling means for operatively controlling the clutch for connecting the power transmission shaft to the propelling means. This independent controlling mechanism comprises a tubular shaft 60 which is mounted in the tubular transmission shaft 34 and is adapted to oscillate within said transmission shaft. The upper end of the tubular shaft 60 is provided with a hand operating lever 61. The lower end of the tubular shaft is provided with a crank arm 62 which is secured thereto in any well known manner and has its free end connected by means of a link 63 to a shifter fork 64. The shifter fork 64 is pivoted as shown at 65 to a depending transverse frame member 66, which, in turn, is secured to the main frame 11 of the truck. Extending through the hollow shaft 60 is a second clutch control shaft 67 which is similarly provided with a hand control lever 68 secured to its upper end thereof and a crank arm 69 secured to its lower end. The free end of the crank arm 69 is connected by means of a link 70 to a shifter fork 71, which, in turn, is pivoted at 72 to the transverse frame member 66. The free ends of the shifter forks 64 and 71 are positioned in grooves 72 formed in the clutch members 73 which are splined to the shaft 38. From the above description it will be readily seen that each of the clutch members may be engaged or disengaged from its corresponding clutch member independently of the other by independently manipulating the hand operating levers 68 and 61 or may be simultaneously manipulated by operating these levers together. In this last modified form it will be noted that the spring for normally actuating the clutch in connection with the shifter forks is eliminated so that the clutch members can be positively shifted by the actuation of the hand levers.

While in the above specification I have described one embodiment which my invention may assume in practice, it will, of course, be understood that the same is capable of modification and that modification may be made without departing from the spirit and scope of the invention as expressed in the following claims.

What I claim as my invention and desire to secure by Letters Patent is:

1. The combination with an automotive truck frame provided with propelling means in the form of endless belt track laying devices, means for supporting and driving said endless belt track laying devices, a swing body mounted on the truck, a hollow king pin pivotally connecting the swing body with the truck, a hollow power shaft passing downwardly from within the swing body through said hollow king pin, a horizontal driving shaft operatively related to said power shaft in a manner to be driven thereby and provided with intermediate gearing for imparting movement to said endless belt track laying devices, interconnected shiftable clutches carried by the last named shaft adjacent the respective ends thereof for operating said endless belt track laying devices, clutch operating means pivotally related to said truck frame, resilient means positioned between the respective clutches and said clutch operating devices for yieldingly holding said clutches in driving engagement, a shaft passing downwardly from within the swing body through said hollow power shaft and connected to said clutch operating means for actuating said clutches, and means for oscillating said last named shaft in a manner to shift one or the other of said clutches out of driving engagement against the action of the resilient means associated with the clutch at the opposite end of said drive shaft.

2. The combination with an automotive truck having a pair of propelling devices, a swing body mounted on said truck, a hollow king pin pivotally connecting the swing body with the truck, a tubular power transmitting shaft extending through the hollow king pin, a pair of clutch mechanisms for connecting the power transmitting shaft with the respective truck propelling devices, said clutch mechanisms comprising shiftable clutch members, clutch rings operatively related to said members, springs for moving the respective clutch members outwardly into operative engagement with co-operating clutch elements for driving said propelling devices, means connected to said clutch members and co-operable with said rings for limiting the outward movement of said members, a pair of connected shifter forks pivotally related to said truck and operatively related to said clutch rings, and a manually actuated shaft extending through said tubular power transmitting shaft and operatively related to said shifter forks for shifting either one of said clutch members to inoperative position against the action of the spring associated with the other of said clutch mechanisms.

3. The combination with an automotive truck having a plurality of propelling devices therefor and a swing body mounted thereon, of a hollow king pin pivotally connecting said body and truck, a tubular power shaft extending through said king pin, a drive shaft operatively related to said power shaft in a manner to be driven thereby, a pair of clutch mechanisms for normally connecting said drive shaft to the respective propelling devices, and means for actuating either one of said clutch mechanisms at will in a manner to disconnect one or the other of said propelling devices from said shaft, said means comprising a pair of shifter forks pivotally related intermediate their end portions to said truck, and having one of their end portions operatively related to said clutch mechanisms, means for connecting the opposite ends of said forks, an oscillatable shaft extending through said tubular power shaft, an arm secured to one end of said oscillatible shaft and pivotally related to said connecting means, and an actuating lever secured to the opposite end of said oscillatible shaft.

4. The combination with an automotive truck having a plurality of propelling devices therefor and a swing body mounted thereon, of a hollow king pin pivotally connecting said body and truck, a tubular power shaft extending through said king pin, a drive shaft operatively related to said power shaft in a manner to be driven thereby, a pair of clutch mechanisms for connecting said drive shaft to the respective propelling devices, said clutch mechanisms comprising clutch members shiftable longitudinally of said drive shaft, springs for yieldingly holding said members normally in operative engagement with co-operating clutch elements loosely mounted on said shaft, and means for shifting either one of said clutch members at will against the action of the spring associated with the other of said members, in a manner to disconnect one or the other of said propelling devices from said drive shaft, said means comprising a frame member carried by said truck, a pair of shifter forks pivotally mounted intermediate their end portions on said frame member and having one of their end portions operatively related to said clutch members, a cross tie for connecting the opposite ends of said forks, a vertically disposed shaft extending through said tubular power shaft, an arm secured at one of its ends to one end of said vertically disposed shaft and pivotally related at its opposite end to said cross tie, and an actuating lever secured to the opposite end of said vertically disposed shaft.

5. The combination with an automotive truck having a plurality of propelling devices therefor and a swing body mounted thereon, of a hollow king pin pivotally connecting said body and truck, a tubular power shaft extending through said king pin, a drive shaft operatively related to said power shaft in a manner to be driven thereby, a pair of clutch mechanisms for normally connecting said drive shaft to the respective propelling devices, and means for actuating either one of said clutch mechanisms at will in a manner to disconnect one or the other of said propelling devices from said shaft, said means comprising a pair of shifter forks pivotally related intermediate their end portions to said truck, and having one of their end portions operatively related to said clutch mechanisms, means for connecting the opposite ends of said forks, an oscillatable shaft extending through said tubular power shaft, an arm secured to one end of said oscillatable shaft and pivotally related to said connecting means, an actuating lever secured to the opposite end of said oscillatable shaft, and resilient means positioned between said clutch mechanisms and said forks for yieldingly holding said clutch actuating means including said lever in neutral or normal position and said clutch mechanisms in operative driving position.

In testimony whereof I have signed my name to this specification, on this 28th day of April, A. D. 1924.

ROY S. MOORE.